United States Patent [19]

Fuss

[11] 4,340,027
[45] Jul. 20, 1982

[54] BARBECUE GRILL COVER

[76] Inventor: Gary Fuss, 535 Grove St., Mayville, Wis. 53050

[21] Appl. No.: 144,288

[22] Filed: Apr. 28, 1980

[51] Int. Cl.³ .................. A47J 37/00; F24B 3/00; B65D 51/18
[52] U.S. Cl. .................. 126/25 R; 220/254
[58] Field of Search .......... 126/25 R, 29, 30, 9 R, 126/9 A, 9 B; 220/254

[56] References Cited

U.S. PATENT DOCUMENTS

| | | | |
|---|---|---|---|
| 3,219,227 | 11/1965 | Deisner | 220/254 |
| 3,330,266 | 7/1967 | Stephen | 126/25 R |
| 3,769,901 | 11/1973 | Phillips | 126/25 R |
| 3,977,559 | 8/1976 | Lombardi | 220/254 |
| 4,062,340 | 12/1977 | Huff | 126/25 R |
| 4,090,490 | 5/1978 | Riley et al. | 126/25 R |
| 4,108,141 | 8/1978 | Bauer | 126/9 R |
| 4,140,049 | 2/1979 | Stewart | 126/25 R |
| 4,256,080 | 3/1981 | Seach | 126/25 R |

Primary Examiner—Daniel J. O'Connor
Attorney, Agent, or Firm—Paul H. Gallagher

[57] ABSTRACT

A cover for a round, kettle type barbecue grill, generally dome shaped, adapted for use with a correspondingly shaped, round grill base. It is generally closed, having a relatively stationary fixed back section and a hinged front section forming a door, movable between an open position, exposing the interior of the grill, and a closed position, entirely closing the grill. Even in open position, the cover forms a windbreak and shields the food in the grill from the wind. The cover is designed to be rotatable on the base, so as to position it according to any direction of the wind. In one form, the door extends to and through the bottom edge of the cover, and in another, it terminates short of that edge, and the stationary back section is continuous around its bottom edge, extending below the door. The cover can be put out as a separate item, or as part of a complete grill. It is also well adapted to be put out in different sizes.

8 Claims, 9 Drawing Figures

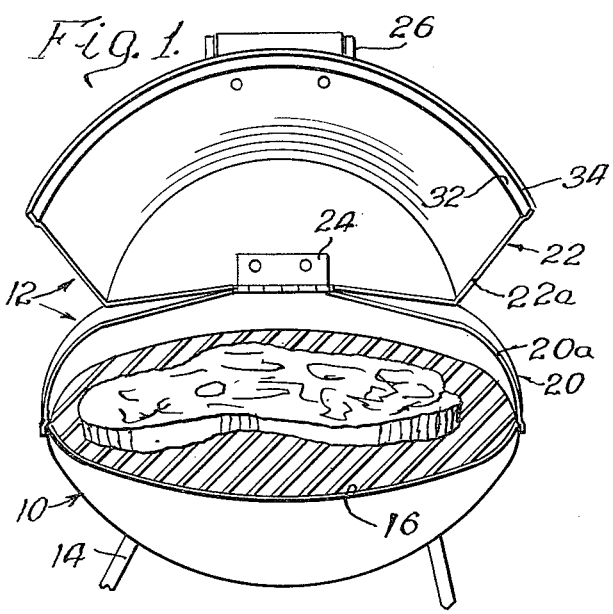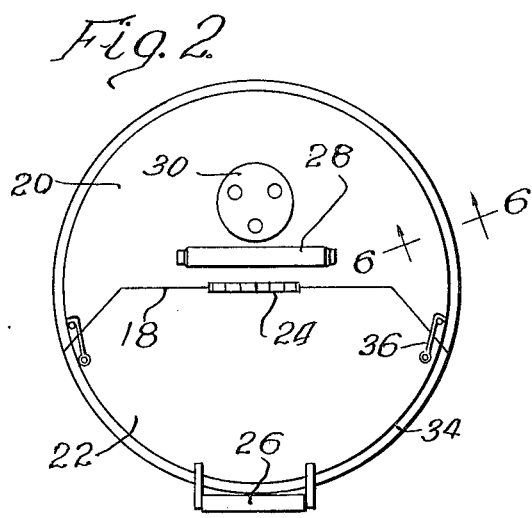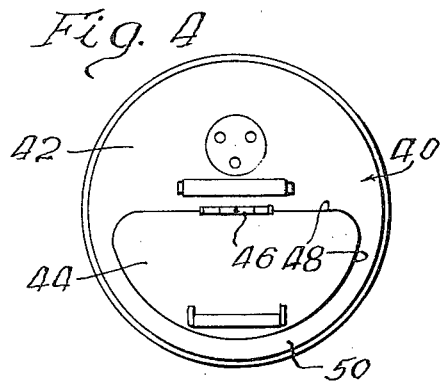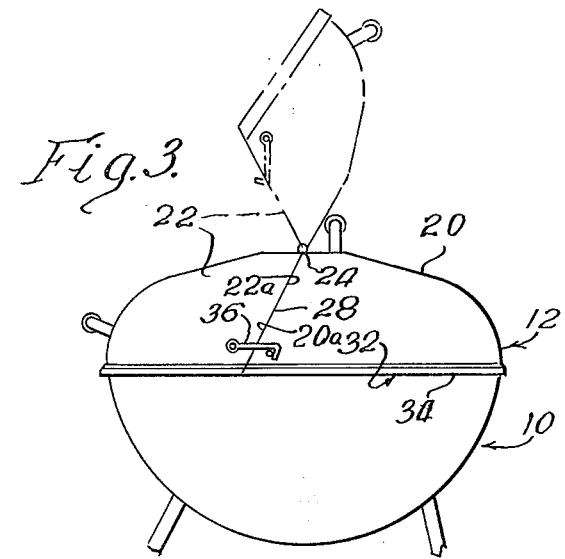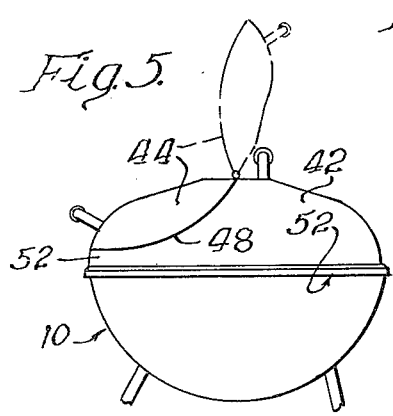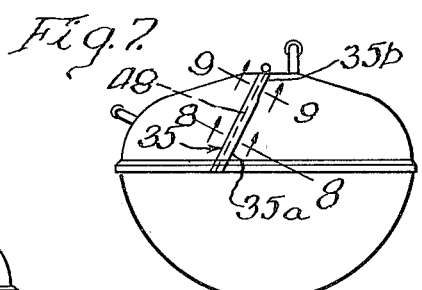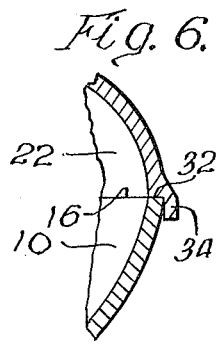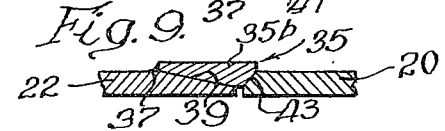

BARBECUE GRILL COVER

This invention is covered by Disclosure Document No. 088,105, filed in the Patent Office Feb. 11, 1980.

OBJECTS OF THE INVENTION

A broad object of the invention is to provide a cover for a barbecue grill:

(a) having a unique construction enabling selective closing and opening of the interior of the grill, so as to selectively provide relatively smoked, or non-smoked, taste to the food being barbecued;

(b) providing a shield against the wind, notwithstanding the open position of the cover;

(c) that is effective for choking and extinguishing the fire in the grill;

(d) that is round in plan view and thereby rotatable about a vertical axis on a correspondingly shaped (round) kettle or base, to orient it according to any direction of the wind;

(e) that is readily adapted to be put on as a separate item to be applied to a grill already in use, or incorporated in a complete grill as a new item, selectively.

DESCRIPTION OF A PREFERRED EMBODIMENT

In the drawings:

FIG. 1. is a perspective view of a barbecue grill incorporating the features of the present invention, with the door in open position;

FIG. 2 is a top view of the grill of FIG. 1, with the door in closed position;

FIG. 3 is a side view taken from the right of FIG. 2;

FIG. 4 is a top view of a modified form;

FIG. 5 is a side view taken from the right of FIG. 4;

FIG. 6 is a detail sectional view taken at line 6—6 of FIG. 2;

FIG. 7 is a view similar to FIG. 3 showing a grill with an edge-seal between the sections of the cover;

FIG. 8 is a sectional view taken at line 8—8 of FIG. 7; and

FIG. 9 is a sectional view taken at line 9—9 of FIG. 7.

Referring in detail to the drawings, FIG. 1 shows an entire barbecue grill that includes a base 10 and a cover 12, the cover specifically incorporating the principal features of the invention. The base 10 may be considered a grill proper, in that it can be used without a cover, and is of the kettle type in which the base is generally in the form of a bowl, and is supported on a suitable stand 14. The base or bowl 10 is round in plan view, and terminates upwardly in a circumferential upper edge 16 which will be referred to again hereinbelow in connection with the cooperation of the cover therewith. The base or bowl 10 is of known type, generally, and grills of this kind are put out by various companies. Such grills may be used without a cover, or with a cover, according to each user's preference. Heretofore, the covers for such grills consisted of a single unitary and effectively integral cover, of dome shape, that may be placed on the grill, completely closing the interior, or removed bodily, completely exposing all of the interior. In the latter case, the interior is of course exposed to the wind.

The cover of the present invention is adapted for use with this kind of grill, and includes the combined features of selectively completely closing the interior of the grill, or exposing the interior somewhat, leaving the interior shielded, but not entirely confined.

The cover of the present invention may be of either of two forms illustrated herein, the first form in FIGS. 1–3, and the second form in FIGS. 4 and 5. The cover 12 in FIG. 1 is in the form of a shell having opposed sections or parts on opposite sides of an upright cut 18, these sections including a relatively stationary, fixed back section 20, and a front section 22 forming a door. The door or front section 22 is hinged by suitable hinge means 24 to the back section, preferably along the top. The hinge means may be a single relatively long hinge, as shown, or a pair of shorter hinges.

The door 22 is swingable between an upper open position shown in FIG. 1, and a lower closed position shown in FIGS. 2 and 3. When the door is closed as in FIGS. 2 and 3, it fits snugly against the back section 20 throughout the extent of the cut 18, and the two sections together form a continuous and unitary cover entirely closing the interior of the grill. The overall area of the cover continues between the sections entirely therearound. The specific shape of the cover, referred to as dome shape, while being round as viewed in plan, may be shaped in vertical cross section as desired for convenience, appearance, economy in manufacture, etc. The door 22 is provided with a suitable handle 26 for grasping it for opening and closing it, while the back section 20 is provided with a similar handle 28 for handling the entire cover as a whole. The usual vent or damper 30 is also provided.

The cover 12 terminates in a circumferential lower edge 32 formed on both of the sections 20 and 22, and this edge is of course continuous when the door is in closed position. The edge 32 engages and rests on the edge 16 on the base 10 (FIG. 6) and the two edges are provided with conformations that interlock to prevent the cover from being displaced transversely from the base. This conformation may be of any suitable kind; for example, the edge 16 may be plain while the edge 32 is provided with an overhanging lip 34 which extends downwardly beyond the upper surface of the edge 16 and forms a flange surrounding the latter.

The sections 20, 22 of the cover are preferably also provided with edge-seal means. This means may be similar to that of FIG. 6 described above, or similar to that shown in FIGS. 7–9. FIGS. 1–3 show the cover without the edge-seal means, to show the overall construction of the cover in its simplest form. Basically, the cover is made up of two sections, with the edges 20a, 22a of those sections opposed at the upright cut 18. The invention is sufficiently broad to cover this simple construction without special edge-seal means, but the construction of FIGS. 7–9 provides a greater sealing effect. In the latter construction, a steel strip 35 is applied to one section, preferably the door as here shown, as by welding at 37, and dimensioned and positioned to overlap the back section 20. The sections at the edges may be relieved somewhat at 39, 41 and the strip 35 correspondingly shaped, to present a trim appearance. The strip 35 may be of any practical width with sufficient overlap to produce the desired seal. At a position remote from the hinge, shown in FIG. 8, the strip as at 35a is wider, since its initial movement in opening is close to the horizontal, but at positions closer to the hinge, as at 25b, as shown in FIG. 9, the movement is abruptly circular and in order for the strip to clear the edge 20a of the back section, the strip is narrower so as to clear that edge, with a correspondingly abrupt relief 43.

In the case of the cover 12 of FIGS. 1–3, hooks 36 are provided for releasably hooking or latching the cover 22 in closed position. This prevents the cover from being accidentally raised or jarred, and adds additional restraint to the cover as a whole, from tending to be displaced laterally.

In a barbecuing operation, it is often desired to entirely close and confine the interior, both for confining the heat for efficiency in cooking, and in confining or controlling the smoke from the taste standpoint. Heretofore in the use of previously known covers, the cover was either completely in closed position, or completely removed from the base. In the former case, it became more efficient and the heat was preserved, but the smoke effect on the food was more pronounced, and many people wished to have less smoke taste. Accordingly, the cover would be removed, but a more extreme situation then existed,—while the food would become less smoked, a great amount of the heat escaped and was lost.

In the use of the cover of the present invention, all of the advantages are preserved, and the disadvantages are overcome. The door 22 may be closed for closing the interior and confining the heat and smoke, or it can be opened and in this position most of the smoke escapes, but the heat is somewhat confined, and particularly the stationary back section 20 acts as a windbreak against the wind that would otherwise tend to remove great amounts of heat from the base.

The cover rests loosely on the base, and because of the round shape, it can be easily turned or rotated thereon, so as to present the back section 20 against the wind to act as a windbreak regardless of direction of the wind. The door when in open position, provides additional shielding of the wind.

The cover is also effective for choking the fire; the meeting edges 16-32, or 20a-22a-35, while not perfectly air tight, produce sufficient seal to slow down and choke the fire.

The form of the invention illustrated in FIGS. 4 and 5 is generally similar to that of FIGS. 1–3 in that it includes a door movable between closed and open positions. In FIGS. 4 and 5 the cover, identified as a whole at 40 includes a relatively stationary back section 42 and a door 44 hinged to the back section by hinge means 46. In the present instance the cut 48 between the door and the back section does not extend down through the lower edge of the cover, but the back section is continuous therearound at its lower portion, having a front strip or piece 50 below the cover. Thus the lower edge 52 of the cover is correspondingly continuous, and its engages and rests on the upper edge 16 of the base. The construction between the upper edge of the base and the lower edge of the cover in this form is also as shown in FIG. 6. Additionally the edge-seal construction of FIGS. 7–9 is preferably incorporated in the form of FIGS. 4 and 5, between the door 44 and back section, 42.

The cover of FIGS. 4 and 5 also is rotatable on the base, and thus, similarly to that of FIGS. 1–3, can be positioned as a windbreak regardless of the direction of the wind.

I claim:

1. A barbecue grill cover for use with a round kettle type grill having a base opening upwardly, and terminating in a circumferential upper edge, said cover being generally dome shape having two sections on opposite sides of a generally upright cut, said sections including a relatively stationary, fixed back section, and a front section forming a door, the door being hinged to the back section at the top, enabling the door to swing outwardly between a lower closed position and an upper open position, the stationary section and door together, when the door is in lower closed position, being continuous throughout the area of the cover, and the cover having a circumferential lower edge engaging and resting on the upper edge of the base, and the cover being rotatable on the base.

2. A barbecue grill cover according to claim 1 wherein, the cover has elements on the meeting edges of the sections of the cover, and on the edges engaging the upper edge of the base, that are effective for substantially sealing those edges against the passage of air.

3. A barbecue grill cover according to claim 1 wherein, the upright cut in the cover extends through the lower edge of the cover, whereby the door forms a portion of the lower edge.

4. A barbecue grill cover according to claim 3 wherein, the lower edge of the cover has a conformation interlocking with the upper edge of the base preventing transverse displacement of the cover from the base, and the cover includes hook means releasably interlocking the sections of the cover in closed position of the door.

5. A barbecue grill cover according to claim 1 wherein, said cut terminates short of the lower edge of the cover, the door is thereby contained within the extent of the cover above the lower edge, and the lower portion of the stationary section is circumferentially continuous and includes a portion under the door, the stationary section also includes an opening engaged by the cover completely the opening.

6. A barbecue grill cover according to claim 5 in conjunction with the grill.

7. A barbecue grill cover according to claim 1 wherein, the cover is provided with a strip secured to one of the sections of the cover at said cut and overlapping the other section, whereby to provide an effective seal against the passage of air through said cut.

8. A barbecue grill cover according to claim 1 in conjunction with the grill.

* * * * *